United States Patent
Long et al.

(10) Patent No.: US 12,124,677 B2
(45) Date of Patent: Oct. 22, 2024

(54) DYNAMIC DISPLAY METHOD AND APPARATUS BASED ON OPERATING BODY, STORAGE MEDIUM AND ELECTRONIC DEVICE

(71) Applicant: Beijing Horizon Robotics Technology Research and Development Co., Ltd., Beijing (CN)

(72) Inventors: Jizhou Long, Beijing (CN); Shaopeng Li, Beijing (CN); Liang Xu, Beijing (CN); Junkai Sun, Beijing (CN)

(73) Assignee: Beijing Horizon Robotics Technology Research and Development Co., Ltd., Beijing (CN)

( * ) Notice: Subject to any disclaimer, the term of this patent is extended or adjusted under 35 U.S.C. 154(b) by 0 days.

(21) Appl. No.: 18/001,824

(22) PCT Filed: Jan. 21, 2022

(86) PCT No.: PCT/CN2022/073218
§ 371 (c)(1),
(2) Date: Dec. 14, 2022

(87) PCT Pub. No.: WO2022/166620
PCT Pub. Date: Aug. 11, 2022

(65) Prior Publication Data
US 2023/0229283 A1    Jul. 20, 2023

(30) Foreign Application Priority Data

Feb. 2, 2021    (CN) .................. 202110141872.X

(51) Int. Cl.
*G06F 3/048*    (2013.01)
*G06F 3/04817*    (2022.01)
(Continued)

(52) U.S. Cl.
CPC ......... *G06F 3/04817* (2013.01); *H04N 23/64* (2023.01); *H04N 23/90* (2023.01)

(58) Field of Classification Search
None
See application file for complete search history.

(56) References Cited

U.S. PATENT DOCUMENTS

| 8,655,015 | B2 * | 2/2014 | Nishimoto | A63F 13/213 |
| | | | | 382/103 |
| 8,781,151 | B2 * | 7/2014 | Marks | A63F 13/213 |
| | | | | 345/161 |

(Continued)

FOREIGN PATENT DOCUMENTS

| CN | 103246351 A | 8/2013 |
| CN | 105204764 A | 12/2015 |

(Continued)

OTHER PUBLICATIONS

Search report for corresponding Chinese Application No. 202110141872.X, dated Jan. 7, 2022.

(Continued)

Primary Examiner — Hua Lu
(74) Attorney, Agent, or Firm — K&L Gates LLP

(57) ABSTRACT

Disclosed are a dynamic display method based on an operating body, a computer-readable storage medium and electronic device. The method includes: determining a position of a to-be-displayed icon on a screen in response to an air operation performed by the operating body relative to the screen in space; displaying the icon at the determined position; determining a first movement physical quantity of the operating body in response to detecting the operating body moving; determining a second movement physical quantity of the icon on the screen based on the first movement physical quantity; and controlling the icon to be dragged on the screen based on the second movement (Continued)

physical quantity. Thus, a user can know whether the air operation is accurate or not in real time according to a moving track of the icon, which improves the user's sense of control and the accuracy of the air operation.

12 Claims, 8 Drawing Sheets

(51) Int. Cl.
  *H04N 23/60* (2023.01)
  *H04N 23/90* (2023.01)

(56) References Cited

U.S. PATENT DOCUMENTS

| | | | |
|---|---|---|---|
| 9,229,533 B2 | 1/2016 | Shigeta et al. | |
| 9,256,288 B2 * | 2/2016 | Lee | G06F 3/011 |
| 9,600,078 B2 * | 3/2017 | Rafii | G06T 15/20 |
| 9,619,104 B2 * | 4/2017 | Xin | G06F 3/04815 |
| 10,748,302 B1 * | 8/2020 | Dine | G06T 7/579 |
| 11,245,832 B2 | 2/2022 | Zhang et al. | |
| 11,531,431 B2 * | 12/2022 | Gotoh | G06F 3/04883 |
| 2010/0013860 A1 * | 1/2010 | Mandella | G06F 3/04815 345/157 |
| 2011/0216075 A1 * | 9/2011 | Shigeta | G06F 3/048 345/473 |
| 2012/0131518 A1 * | 5/2012 | Lee | G06F 3/0346 715/863 |
| 2012/0327118 A1 * | 12/2012 | Ooi | H04N 21/47214 345/633 |
| 2013/0215148 A1 * | 8/2013 | Antonyuk | G06F 3/017 345/633 |
| 2013/0328762 A1 * | 12/2013 | McCulloch | G06F 3/016 345/156 |
| 2014/0191947 A1 * | 7/2014 | Sharma | G09G 5/377 345/156 |
| 2014/0375547 A1 * | 12/2014 | Katz | G06F 3/011 345/156 |
| 2015/0062004 A1 * | 3/2015 | Rafii | G06F 3/011 345/156 |
| 2015/0153834 A1 * | 6/2015 | Akiyama | G06F 3/0481 345/156 |
| 2015/0302617 A1 * | 10/2015 | Shimura | G06T 11/203 345/441 |
| 2015/0371447 A1 * | 12/2015 | Yasutake | G06T 19/006 345/633 |
| 2016/0026255 A1 * | 1/2016 | Katz | G06V 20/64 345/156 |
| 2016/0098095 A1 * | 4/2016 | Gonzalez-Banos | A63F 13/92 345/156 |
| 2017/0123593 A1 * | 5/2017 | Send | G06F 3/042 |
| 2017/0358141 A1 * | 12/2017 | Stafford | G06T 7/246 |
| 2019/0051054 A1 * | 2/2019 | Jovanovic | G06F 3/04815 |
| 2019/0094981 A1 * | 3/2019 | Bradski | G06F 3/0346 |
| 2019/0146588 A1 * | 5/2019 | Levesque | G06F 3/014 340/407.2 |
| 2019/0147619 A1 * | 5/2019 | Goldman | G06T 17/05 382/154 |
| 2019/0253611 A1 * | 8/2019 | Wang | H04N 23/62 |
| 2020/0026362 A1 * | 1/2020 | Kim | G06F 3/013 |
| 2020/0042777 A1 * | 2/2020 | Zhang | G06T 7/248 |
| 2020/0150849 A1 * | 5/2020 | Arena | H04N 21/8133 |
| 2020/0326783 A1 * | 10/2020 | Kwon | G06V 10/764 |
| 2020/0336672 A1 * | 10/2020 | Zhang | H04N 23/671 |
| 2020/0380724 A1 * | 12/2020 | Ke | G06T 19/006 |
| 2021/0174596 A1 * | 6/2021 | Zhang | G06F 16/954 |
| 2021/0209797 A1 * | 7/2021 | Lee | G06T 17/00 |
| 2022/0080829 A1 * | 3/2022 | Choi | G06T 7/292 |
| 2022/0319146 A1 * | 10/2022 | Xu | G06V 20/64 |

FOREIGN PATENT DOCUMENTS

| | | |
|---|---|---|
| CN | 105430158 A | 3/2016 |
| CN | 108874136 A | 11/2018 |
| CN | 109725724 A | 5/2019 |
| CN | 110099211 A | 8/2019 |
| CN | 112835484 A | 5/2021 |
| EP | 3035162 A1 | 6/2016 |
| JP | 2011186730 A | 9/2011 |
| JP | 2012113715 A | 6/2012 |
| JP | 2015108870 A | 6/2015 |
| JP | 2017068468 A | 4/2017 |
| WO | 2014080829 A1 | 5/2014 |
| WO | 2022166620 A1 | 8/2022 |

OTHER PUBLICATIONS

Office Action for corresponding Chinese Application No. 202110141872.X, dated Jan. 14, 2022.
International Search Report for corresponding International PCT Application No. PCT/CN2022/073218, dated Apr. 8, 2022 (English translation included).
First Office Action from the corresponding Japanese Patent Application No. 2022-565861, mailed on Dec. 5, 2023 (English Translation provided).

* cited by examiner

DYNAMIC DISPLAY METHOD AND APPARATUS BASED ON OPERATING BODY, STORAGE MEDIUM AND ELECTRONIC DEVICE

CROSS-REFERENCE TO RELATED APPLICATIONS

This application is a U.S. National Stage Entry under 35 U.S.C. § 371 of International Patent Application No. PCT/CN2022/073218, entitled DYNAMIC DISPLAY METHOD AND APPARATUS BASED ON OPERATING BODY, STORAGE MEDIUM AND ELECTRONIC DEVICE, filed Jan. 21, 2022, which claims priority to and the benefit of Chinese Patent Application No. 202110141872.X, entitled Dynamic Display Method and Apparatus Based on Operating Body, Storage Medium and Electronic Device, filed with the China National Intellectual Property Administration (CNIPA) on Feb. 2, 2021. The entire disclosures of which are incorporated by reference in their entirety herein.

FIELD OF THE PRESENT DISCLOSURE

The present disclosure relates to the technical field of computers, and more particularly to a dynamic display method and apparatus based on an operating body, a computer-readable storage medium and an electronic device.

BACKGROUND OF THE PRESENT DISCLOSURE

With the continuous improvements of the capabilities of computer software and hardware and the growing demands for human-computer interactions, air operation and recognition has received extensive attention. The air operation methods may be applied to augmented reality (AR)/virtual reality (VR), smart phones, smart home appliances and other scenarios, such that people can use an air operation to control a machine when they are inconvenient to directly operate a control panel by hand, which facilitates people's lives.

SUMMARY OF THE PRESENT DISCLOSURE

Embodiments of the present disclosure provide a dynamic display method and apparatus based on an operating body, a computer-readable storage medium and an electronic device.

An embodiment of the present disclosure provides a dynamic display method based on an operating body. The method includes the following steps: determining a position of a to-be-displayed icon on a screen in response to an air operation performed by the operating body relative to the screen in space; displaying the icon at the determined position; determining a first movement physical quantity of the operating body in response to detecting a movement of the operating body; determining a second movement physical quantity of the icon on the screen based on the first movement physical quantity; and controlling the icon to be dragged on the screen based on the second movement physical quantity.

The operating body is a user's body part or an object with a specific shape; and the first movement physical quantity is an actual physical quantity of the operating body in space, or a physical quantity of the operating body mapped into a captured image.

According to another aspect of embodiments of the present disclosure, a dynamic display apparatus based on an operating body is provided. The apparatus includes a first determination module, a display module, a second determination module, a third determination module and a control module. Further, the first determination module is configured to determine a position of a to-be-displayed icon on a screen in response to an air operation performed by the operating body relative to the screen in space; the display module is configured to display the icon at the determined position based on the first determination module; the second determination module is configured to determine a first movement physical quantity of the operating body in response to detecting a movement of the operating body; the third determination module is configured to determine a second movement physical quantity of the icon on the screen based on the first movement physical quantity determined by the second determination module; and the control module is configured to control the icon to be dragged on the screen based on the second movement physical quantity determined by the third determination module.

The operating body is a user's body part or an object with a specific shape; and the first movement physical quantity is an actual physical quantity of the operating body in space, or a physical quantity of the operating body mapped into a captured image.

According to still another aspect of embodiments of the present disclosure, a computer-readable storage medium is provided. The computer-readable storage medium is configured to store a computer program therein, wherein the computer program is configured to perform the above-mentioned dynamic display method based on the operating body.

According to still another aspect of embodiments of the present disclosure, an electronic device is provided. The electronic device includes a processor; and a memory configured to store instructions executable by the processor, wherein the processor is configured to read the executable instructions from the memory and execute the instructions to implement the above-mentioned dynamic display method based on the operating body.

According to the dynamic display method and apparatus based on the operating body, the computer-readable storage medium and the electronic device provided by the above embodiments of the present disclosure, when the operating body performs an air operation in space, the position of the icon mapped by the operating body on the screen is determined; the first movement physical quantity of the operating body is determined in response to the detection of the movement of the operating body; the second movement physical quantity of the icon on the screen is determined based on the first movement physical quantity; and finally, the icon is controlled to be dragged on the screen based on the second movement physical quantity. As a result, when the operating body performs an air operation in space, a moving track of the operating body can be fed back in real time by dragging the icon on the screen, such that a user can know whether the air operation is accurate or not in real time according to the moving track of the icon, which improves the user's sense of control and facilitates improving the accuracy of the air operation.

The technical solutions of the present disclosure will be further described below in conjunction with the accompanying drawings and embodiments.

BRIEF DESCRIPTION OF THE DRAWINGS

The above and other objects, features and advantages of the present disclosure will become more apparent from the more detailed description of the embodiments of the present disclosure in conjunction with the accompanying drawings.

The accompanying drawings are used to provide a further understanding of the embodiments of the present disclosure, and constitute a part of the description to explain the present disclosure together with the embodiments of the present disclosure, without limiting the present disclosure. In the drawings, the same reference symbols generally refer to the same components or steps.

DESCRIPTION OF THE EMBODIMENTS

Figure 1:
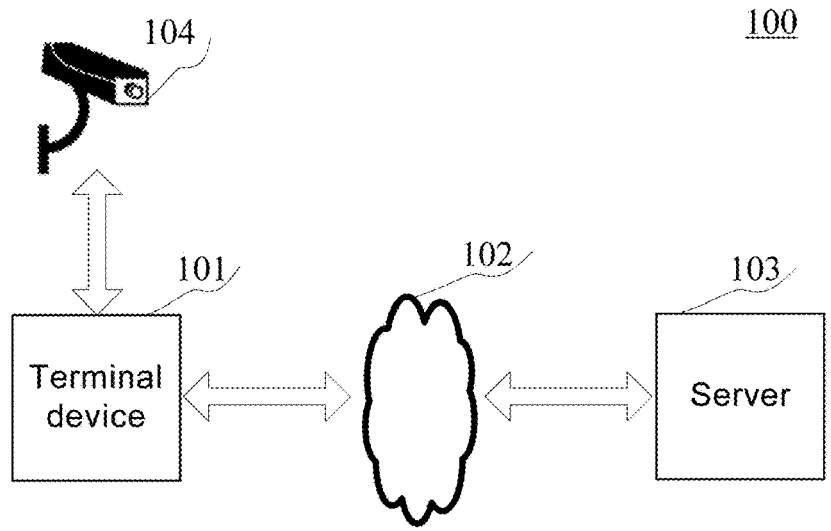
FIG. 1 is a system diagram to which the present disclosure is applied.

The exemplary embodiments of the present disclosure are described in detail below with reference to the accompanying drawings. Of course, the described embodiments are merely some embodiments, rather than all embodiments, of the present disclosure. It should be understood that the present disclosure is not limited by the exemplary embodiments described herein.

It should be noted that, unless specified otherwise, the relative arrangements of the components and steps, the mathematical formulas and numerical values described in these embodiments do not limit the scope of the present disclosure.

It may be understood by those skilled in the art that terms such as "first" and "second" in the embodiments of the present disclosure are only used to distinguish different steps, devices, or modules, etc., and neither represent any specific technical meaning, nor a necessary logical sequence among them.

It should also be understood that, in the embodiments of the present disclosure, "a plurality of" may refer to two or more, and "at least one" may refer to one, two or more.

It should also be understood that the number of any component, data or structure mentioned in the embodiments of the present disclosure can generally be understood to be one or more in the case of not being explicitly defined or given contrary indications in the context.

In addition, the term "and/or" herein only describes the correspondence of the corresponding objects, indicating three kinds of relationship. For example, A and/or B, can be expressed as: A alone, both A and B, and B alone. In addition, the character "/" herein generally indicates an "or" relationship between the contextual objects.

It should also be understood that the description of the various embodiments in the present disclosure emphasizes the differences between the various embodiments, and the same or similar points may be referred to each other, which, for the sake of brevity, will not be repeated.

Meanwhile, it should be understood that, for the convenience of description, the dimensions of various parts shown in the accompanying drawings are not drawn in an actual proportional relationship.

The following descriptions for at least one exemplary embodiment are actually descriptive only, and shall not be intended to limit the present disclosure and any application or use thereof.

The techniques, methods and devices well known to those skilled in the related arts may not be discussed in detail. However, where applicable, such techniques, methods and devices should be deemed as a part of the description.

It should be noted that similar signs and letters in the following drawings represent similar items. Therefore, once defined in one drawing, an item may not be further discussed in the followed drawings.

Embodiments of the present disclosure may be applied to a terminal device, a computer system, a server and other electronic devices, which can operate with numerous other general-purpose or special-purpose computing system environments or configurations. Examples of well-known terminal devices, computing systems, environments and/or configurations suitable for use with terminal devices, computer systems, servers and other electronic devices include, but are not limited to: a personal computer system, a server computer system, a thin client, a thick client, a handheld or laptop device, a microprocessor-based system, a set-top box, programmable consumer electronics, a network personal computer, a minicomputer system, a mainframe computer system, a distributed cloud computing technology environment including any of the above systems, etc.

A terminal device, a computer system, a server and other electronic devices may be described in the general context of computer system-executable instructions, such as program modules, which are executed by the computer system. Generally, the program modules may include routines, programs, object programs, components, logic, data structures, etc. that perform particular tasks or implement particular abstract data types. The computer system/server may be implemented in a distributed cloud computing environment where tasks are performed by a remote processing device that is linked through a communication network. In the distributed cloud computing environment, the program modules may be located on a local or remote computing system storage medium including a storage device.

Application Overview

In the existing air operation methods, a system usually gives visual feedback only after a successful operation of an operating body. For example, this feedback is displayed in the form of an interface pop-up window. There is often no feedback before the operation is successful, so a user does not know whether the current air operation of the operating body is qualified or not before the operation is successful. If it is not qualified, the actual effect of the air operation will not match an expected effect, thereby reducing the user's sense of control over an expected action. The technical solutions provided in embodiments of the present disclosure are used to improve the accuracy of the user's air operation, thereby improving the user's sense of control.

Exemplary System

FIG. 1 illustrates an exemplary system architecture 100 which may be applied to a dynamic display method based on an operating body or a dynamic display apparatus based on an operating body as provided by embodiments of the present disclosure.

As shown in FIG. 1, the system architecture 100 may include a terminal device 101, a network 102, a server 103 and an operating body position acquisition device 104. The network 102 is configured to provide a medium for a communication link between the terminal device 101 and the server 103. The network 102 may include various connection types, such as wired or wireless communication links, or fiber optic cables, etc.

The user may use the terminal device 101 to interact with the server 103 via the network 102 to receive or send messages, etc. Various communication client applications, such as virtual reality applications, augmented reality applications, search applications, web browser applications and instant communication tools may be installed on the terminal device 101.

The terminal device 101 may be various electronic devices, including but not limited to, a vehicular terminal (such as a car machine or a center console on a vehicle), a mobile phone, a notebook computer, a digital broadcast receiver, a personal digital assistant (PDA), PAD (a type of tablet computer), a portable media player (PPM) or other mobile terminals, and a digital TV, a desktop computer or other fixed terminals.

The server 103 may be a server that provides various services, such as a back-end server that recognizes to-be-identified data for the operating body (e.g., data including a point cloud, an image of the operating body, etc.) uploaded by the terminal device 101. The back-end server may process the received to-be-identified data to obtain a processing result (e.g., a movement physical quantity corresponding to an icon displayed on a screen).

The operating body position acquisition device 104 may be various devices for acquiring the positions of the operating body, such as a monocular camera, a binocular stereo camera, LIDAR, or a three-dimensional structured optical imaging device.

It should be noted that, the dynamic display method based on an operating body as provided by the embodiments of the present disclosure may be executed by the server 103 or the terminal device 101. Correspondingly, the dynamic display apparatus based on an operating body as a functional module or component may be provided in the server 103, or may be provided in the terminal device 101, which is not limited in the present disclosure.

It should be understood that the number of the terminal device 101, the network 102, the server 103 and the operating body position acquisition device 104 in FIG. 1 may be one or more respectively. The respective devices shown in FIG. 1 are only of one possible technical scenario, and other technical scenarios may also include two or more devices. According to implementation requirements, there may be any number of terminal devices, networks, servers, and operating body position acquisition devices. In the case that data for identifying the position of the operating body does not need to be acquired remotely, the system architecture may not include the network 102, but only include the operating body position acquisition device 104 and the terminal device 101, or only include the operating body position acquisition device 104 and the server 103.

Exemplary Method

Figure 2:
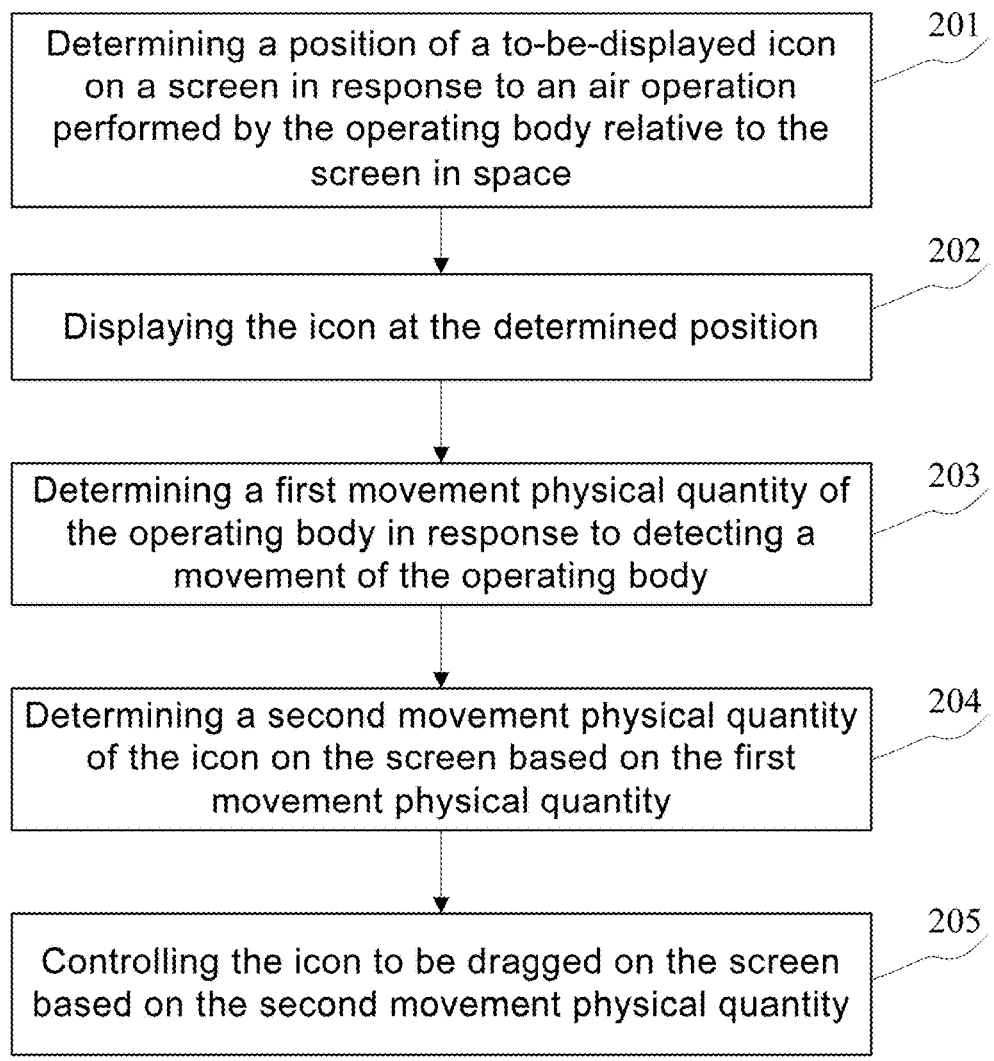
FIG. 2 is a schematic flowchart of a dynamic display method based on an operating body as provided by an exemplary embodiment of the present disclosure.

FIG. 2 is a schematic flowchart of a dynamic display method based on an operating body as provided by an exemplary embodiment of the present disclosure. This embodiment may be applied to an electronic device (for example, the terminal device 101 or the server 103 shown in FIG. 1). As shown in FIG. 2, the method includes the following steps 201 to 205.

In step 201, a position of a to-be-displayed icon on a screen is determined in response to an air operation performed by the operating body relative to the screen in space.

In this embodiment, the electronic device may determine the position of the to-be-displayed icon on the screen in response to the air operation performed by the operating body relative to the screen in space. The operating body is a variety of hardware entities or specific body parts of a user that perform air operations on a controlled device. For example, the operating body may be a body part of a user, such as a user's hand or head, or may also be a handle, etc. The operating body may output position information to the electronic device in real time. In addition, the operating body may also be other object or hardware entity with a specific shape, or the like.

The electronic device may determine the position of the operating body in real time based on various methods. Generally, the electronic device may acquire the to-be-identified data acquired by the operating body position acquisition device 104 as shown in FIG. 1 for the operating body, and identify the to-be-identified data, thereby determining the position of the operating body. As an example, the operating body position acquisition device 104 may be a monocular camera; and the electronic device may identify an image frame of the operating body acquired by the monocular camera in real time, and determine a position of the operating body in the image frame. For another example, the operating body position acquisition device 104 may be a binocular stereo camera; and the electronic device may identify a binocular image frame acquired by the binocular stereo camera in real time, and determine a position of the operating body in a three-dimensional space.

The electronic device may map the determined position of the operating body to a corresponding position on the screen as the position of the to-be-displayed icon on the screen. The screen may be a screen included in the electronic device, or may be a screen included in a device connected to the electronic device. For example, the screen may be a screen of a center console on a vehicle. Generally, a corresponding relationship between the position of the operating body and the position on the screen may be preset, and the position of the operating body is mapped onto the screen according to this corresponding relationship. As an example, when the operating body position acquisition device 104 is a monocular camera, the electronic device may determine the corresponding position of the operating body on the screen according to a preset corresponding relationship between pixel points in an image captured by the monocular camera and pixel points of the screen. For another example, when the operating body position acquisition device 104 is LIDAR, the electronic device may determine the corresponding position of the operating body on the screen according to a preset corresponding relationship between points in a detection range of LIDAR and pixel points of the screen.

In this embodiment, the electronic device may determine in real time whether the operating body is performing an air operation in space. For example, when it is detected that the operating body appears within a detection range of the operation position acquisition device 104 or the operating body is moving within the detection range of the operating body position acquisition device 104, the operating body is determined to perform an air operation.

In step 202, the icon is displayed at the determined position.

In this embodiment, the electronic device may display the to-be-displayed icon at a position of the to-be-displayed icon on the screen. The icon may be of various types and shapes. For example, the icon may be a static image or a dynamic image. The shape of the icon may be a fixed shape or a shape that changes in real time. As an example, the icon may be in the shape of a water drop; and the icon may be a dynamic graph representing a shaking state of the water drop.

In step 203, a first movement physical quantity of the operating body is determined in response to the detection of a movement of the operating body.

In this embodiment, the electronic device may determine a first movement physical quantity of the operating body in response to the detection of the movement of the operating body. The first movement physical quantity may include, but is not limited to, at least one of the followings: a movement speed, a movement direction, a movement range, and the like. It should be noted that the first movement physical quantity may be an actual physical quantity of the operating body in space, or may be a physical quantity of the operating body mapped to other dimensions (e.g., a two-dimensional image plane or a three-dimensional virtual space).

As an example, when the operating body position acquisition device 104 is a monocular camera, the first movement physical quantity may be a physical quantity of the operating body mapped into an image captured by the monocular camera. As another example, when the operating body position acquisition device 104 is a three-dimensional detection device such as LIDAR, the first movement physical quantity may be an actual physical quantity of the operating body in space.

In step 204, a second movement physical quantity of the icon on the screen is determined based on the first movement physical quantity.

In this embodiment, the electronic device may determine the second movement physical quantity of the icon on the screen based on the first movement physical quantity. Specifically, the electronic device may determine the second moving physical quantity of the icon on the screen according to a preset mapping relationship between a dimension of the first movement physical quantity and the screen. The second movement physical quantity may include, but is not limited to, at least one of the followings: a movement speed, a movement direction, a movement range (e.g., a movement distance of the icon on the screen), and the like.

As an example, when the operating body position acquisition device 104 is a monocular camera, the electronic device may determine the second movement physical quantity of the icon on the screen according to a preset corresponding relationship between pixel points in an image captured by the monocular camera and pixel points of the screen. For another example, when the operating body position acquisition device 104 is a three-dimensional detection device such as LIDAR, the electronic device may determine the second movement physical quantity of the icon on the screen according to a preset corresponding relationship between points within a detection range of the three-dimensional detection device and pixel points of the screen.

In step 205, the icon is controlled to be dragged on the screen based on the second movement physical quantity.

In this embodiment, the electronic device may control the icon to be dragged on the screen based on the second movement physical quantity. During the dragging process, the icon can remain unchanged in shape, or can produce a preset dynamic effect, such as trailing or deformation.

According to the method provided by the above embodiment of the present disclosure, when the operating body remotely operates in space, the position of the icon mapped by the operating body on the screen is determined; the first movement physical quantity of the operating body is determined in response to the detection of the movement of the operating body; the second movement physical quantity of the icon on the screen is determined based on the first movement physical quantity; and finally, the icon is controlled to be dragged on the screen based on the second movement physical quantity. Therefore, when the operating body performs an air operation, a moving track of the operating body can be fed back in real time by dragging the icon on the screen, such that a user can know whether the air operation is accurate or not in real time according to the moving track of the icon, and the second movement physical quantity of the icon on the screen reflects the weight sense of the air operation of the operating body, which greatly improves the user's sense of control and facilitates improving the accuracy of the air operation.

In some optional implementations, the step 205 may include the following steps.

Firstly, a trailing length, a first movement direction and a first movement speed of the icon on the screen are determined based on the second movement physical quantity.

Generally, the second movement physical quantity may include the first movement direction and the first movement speed as mentioned above. The trailing length may correspond to the first movement speed. For example, the faster the first movement speed is, the longer the trailing length is. As an example, the trailing length may be reflected by a display duration of the moving icon at each position. For example, when the icon is displayed for the same duration at each position it passes through, if the first movement speed is higher, a moving distance of the icon from a position at a first moment to a position at a second moment is longer, indicating that the trailing length is longer. On the contrary, if the first movement speed is lower, the moving distance of the icon from the position at the first moment to the position at the second moment is shorter, indicating that the trailing length is shorter. In other words, the trailing length varies with the magnitude of the first movement speed.

Then, a tail shape of the icon is adjusted based on the trailing length.

Generally, the icon may include a head and a tail in the movement process. If the trailing length is longer, the shape of the tail may be changed from thick to thin to a small extent; and if the trailing length is shorter, the shape of the tail may be changed from thick to thin to a great extent. As an example, the shape of the tail may be reflected by a shape change of the moving icon at each position it passes through. For example, the moving icon is displayed for the same duration at each position it passes through, and the display size changes from large to small. If the first movement speed is higher, a moving distance of the icon from a position at a first moment to a position at a second moment is longer, indicating that the trailing length is longer and the magnitude of the tail varies from thick to thin to a small extent. On the contrary, if the first movement speed is lower, the moving distance of the icon from the position at the first moment to the position at the second moment is shorter, indicating that the trailing length is shorter and the magnitude of the tail varies from thick to thin to a great extent.

Finally, the icon is controlled to be dragged along the first movement direction at the first movement speed.

Figure 3A:
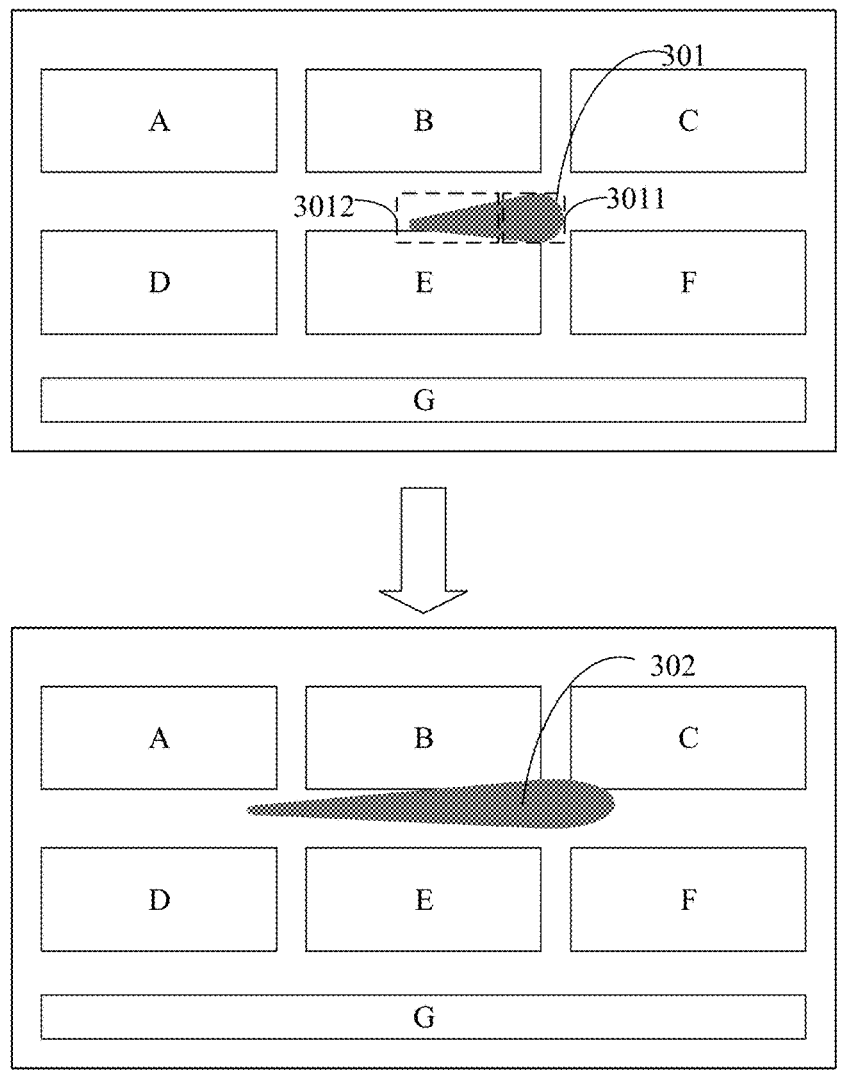
FIG. 3A is an exemplary schematic diagram of an application scenario of a dynamic display method based on an operating body as provided by an exemplary embodiment of the present disclosure.

FIG. 3A is a schematic diagram of an application scenario according to an embodiment of the present disclosure. In this application scenario, the operating body is a user's hand; and the screen is a screen on a center console of a vehicle. Boxes corresponding to symbols A-F on the screen may represent triggering areas of various functional modules, such as a navigation module, a radio module, a Bluetooth music module and the like. An area corresponding to a symbol G may be an area that displays various information, such as a current time, a current position of the vehicle, a temperature in the vehicle.

The electronic device recognizes a position of the user's hand in an image captured by a camera on the top of the vehicle. According to this embodiment of the present disclosure, the hand position is mapped to the screen in real time, and an icon in the shape of a water drop is displayed at the corresponding position on the screen. The electronic device controls the center console to perform corresponding functions by recognizing a moving track of the icon, so as to realize the user's air operation for the center console. For example, the icon moving from left to right means playing the next music; and the icon moving in a circle on the screen means closing the screen, etc. As shown in FIG. 3A, when the user's hand moves slowly, the icon on the screen is shown as 301, and the trailing length is shorter; and when the user's hand moves quickly, the icon on the screen is shown as 302, and the trailing length is longer.

In this implementation, by displaying a trailing tail with the corresponding length when the icon moves, the user may feel the current movement speed of the operating body more intuitively, which may facilitate the user to adjust the movement speed of the operating body more effectively, thereby improving the accuracy of the air operation.

In some optional implementations, the electronic device may also execute the following step:

demonstrating, at the current display position of the icon on the screen, a shape change of the icon according to a first preset animation in response to the detection that the operating body leaves a detection boundary of a device for detecting the air operation of the operating body.

The device for detecting the air operation of the operating body may be the operating body position acquisition device 104 as shown in FIG. 1. As an example, when the operating body position acquisition device 104 is a monocular camera, the above-mentioned detection boundary may be a boundary defined in a captured image, and this boundary may be a boundary of a display range of the image, or may be a boundary of a range of a specific size set in the image. As another example, when the operating body position acquisition device 104 is a three-dimensional detection device such as LIDAR, the above-mentioned detection boundary may be a boundary defined within a detection range of the three-dimensional detection device, and this boundary may be an actual boundary of the detection range described above, or may be a boundary of a range of a specific size set in the detection range.

Generally, the above detection boundary corresponds to a display boundary of the screen. When it is detected that the operating body leaves the detection boundary of the device, the display boundary of the screen may demonstrate the shape change of the icon according to the first preset animation. As an example, the shape of the icon may be in the shape of a water drop, the first preset animation may be an animation representing that the water drop is crushed, and the device is used to detect the air operation of the operating body.

Figure 3B:
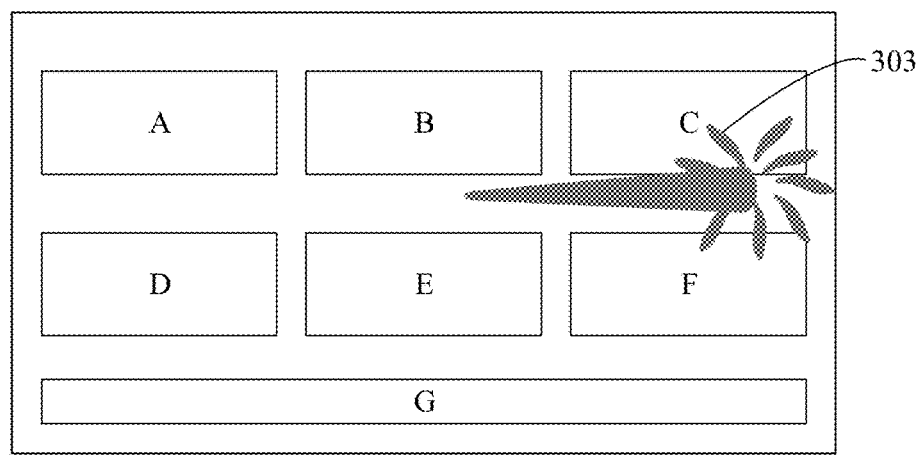
FIG. 3B is an exemplary schematic diagram of another application scenario of a dynamic display method based on an operating body as provided by another exemplary embodiment of the present disclosure.

FIG. 3B is a schematic diagram of another application scenario according to an embodiment of the present disclosure. As shown in FIG. 3B, when the movement range of the user's hand (i.e., the operating body) is too large and leaves the detection boundary of the monocular camera or the three-dimensional detection device, the water drop icon will correspondingly move to the display boundary of the screen, and the first preset animation will be displayed at the boundary position of the screen. As shown by a reference symbol 303 in FIG. 3B, the first preset animation is a process in which the water drop is crushed. It should be noted that a speed at which the water drop is crushed and a degree of rupture of the water drop are positively related to a speed of a gesture; for example, the higher the speed of the gesture is, the faster the water drop is crushed and the more fragmented particles of the water drop are.

In this implementation, by demonstrating the first preset animation on the screen when the operating body leaves the detection boundary, it is possible to dynamically prompt the user that the operating body has currently reached the detection boundary of the operating body position acquisition device, such that the user can adjust the position of the operating body in time to be within the detection range of the operating body position acquisition device, thereby facilitating improving the accuracy of the user's air operation and improving the user's sense of control.

In some optional implementations, the electronic device may also execute the following steps:

determining a movement speed of the operating body according to the first movement physical quantity, wherein the movement speed of the operating body is a second movement speed, and the first movement physical quantity includes this second movement speed; and demonstrating, at the current display position of the icon on the screen, a shape change of the icon according to a second preset animation if the second movement speed is greater than or equal to a first preset speed. The first movement physical quantity may include the movement speed of the operating body, such that the current movement speed of the operating body can be determined according to the first movement physical quantity. The second preset animation may be the same as or different from the above-mentioned first preset animation. As an example, the shape of the icon may be in the shape of a water drop; and the second preset animation may be an animation representing that the water drop is cracked.

Figure 3C:
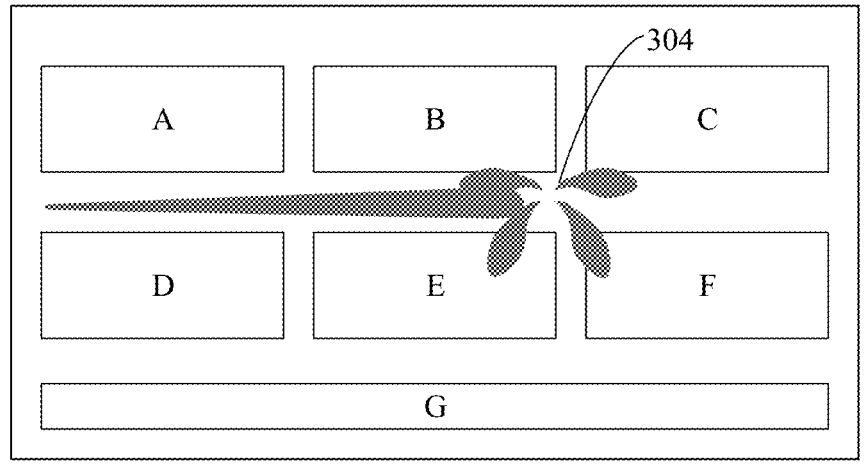
FIG. 3C is an exemplary schematic diagram of another application scenario of a dynamic display method based on an operating body as provided by another exemplary embodiment of the present disclosure.

FIG. 3C is a schematic diagram of another application scenario according to an embodiment of the present disclosure. As shown in FIG. 3C, when it is detected that the movement speed of the user's hand (i.e., the operating body) is too large, the second preset animation is displayed at the current position where the icon moves. As shown by a reference symbol 304 in FIG. 3C, the second preset animation is a partial demonstration of the water drop cracking process. It should be noted that a speed at which the water drop is cracked and a cracking degree of the water drop are positively related to a speed of a gesture; for example, the higher the speed of the gesture is, the faster the water drop is cracked and the more fragmented particles of the water drop are.

In this implementation, by demonstrating the second preset animation when the movement speed of the operating body is too large, the user is prompted to adjust the movement speed of the operating body to a preset normal speed range, which facilitates the user to control the movement speed of the operating body within a reasonable range, improves the accuracy of the user's air operation, and improves the user's sense of control.

Figure 3D:
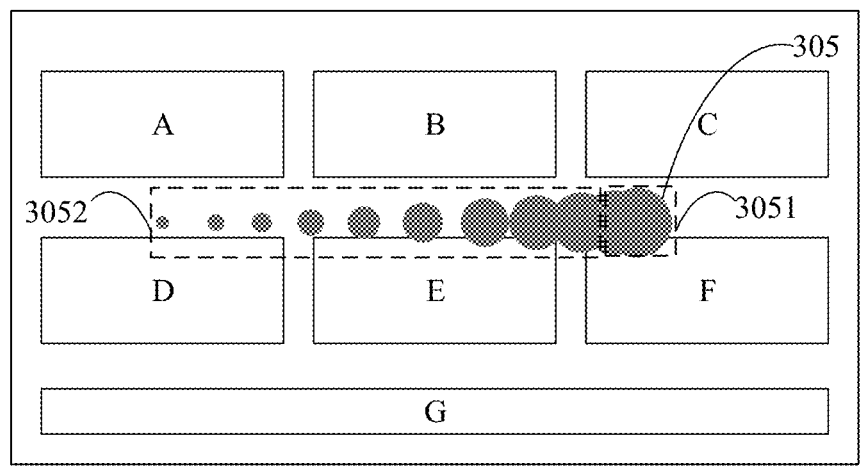
FIG. 3D is an exemplary schematic diagram of another application scenario of a dynamic display method based on an operating body as provided by another exemplary embodiment of the present disclosure.

It should be noted that the icon in the present disclosure includes a main body and a tail. In the case that the icon in FIGS. 3A to 3C is illustrated in the shape of a water drop, the main body 31 and the tail 32 are of an integrated structure. As shown in FIG. 3A, two dashed boxes 3011 and 3012 represent the main body and the tail, respectively. In addition, with respect to an icon shown in FIG. 3D in the present disclosure, the main body and the tail may also be split. For example, an icon 305 in FIG. 3D includes a main body 3051 and a tail 3052, wherein the tail 3052 may present a weight sense of the user's air operation by means of the distribution of a water drop that is discrete and sequentially decrease in area, thereby improving the user's sense of control.

In some optional implementations, the electronic device may also execute the following step:

determining a movement speed of the icon according to the second movement physical quantity, wherein the movement speed of the icon may be the aforementioned first movement speed; and adjusting a display size of the main body of the icon on the screen based on a vertical distance between the operating body and a plane where the screen is located if the first movement speed is less than or equal to a second preset speed.

The second movement physical quantity may include the movement speed of the icon, such that the current movement speed of the icon can be determined according to the second movement physical quantity. When the current movement speed of the icon is less than or equal to the second preset speed, it means that the icon currently is in an approximately stationary state. That is, the operating body is in an approximately stationary state on a plane parallel to the plane where the screen is located. At this time, the user can adjust the vertical distance between the operating body and the plane where the screen is located, and the size of the icon varies with the change of the vertical distance. Generally, the smaller the above-mentioned vertical distance is, the larger the size of the icon is. Therefore, an effect of pressing the screen by the operating body can be simulated.

The vertical distance can be obtained according to various existing ranging methods. For example, LIDAR, an infrared rangefinder, an ultrasonic rangefinder, a binocular stereo camera and other three-dimensional detection devices may be used to determine the vertical distance between the operating body and the plane where the screen is located.

In this implementation, the display size of the icon can be adjusted according to the vertical distance between the operating body and the plane where the screen is located, which can simulate the weight sense of the user's air operation, and further improve the user's sense of control.

In some optional implementations, the electronic device may also execute the following steps.

Firstly, in the case that a device for detecting the air operation of the operating body is a first camera, a distance between the operating body and the first camera is determined. The distance may be an exact distance or an estimated distance. For example, the electronic device may estimate the distance between the operating body and the first camera according to the size of the operating body in an image captured by the first camera.

Then, a target focal length corresponding to the distance between the operating body and the first camera is determined. A corresponding relationship between the distance and a focal length may be preset. The electronic device may use the focal length corresponding to the current distance between the operating body and the first camera as the target focal length according to this corresponding relationship.

Finally, the focal length of the first camera is adjusted to the target focal length; or if the target focal length corresponding to the distance exceeds a maximum focal length of the first camera, the first camera is switched to a second camera, and a focal length of the second camera is adjusted to the target focal length, such that an image of the operating body is captured by the second camera, wherein the maximum focal length of the second camera is greater than the maximum focal length of the first camera.

Generally, the second camera may be a long-focus camera for capturing close-range objects; and the second camera may be installed next to the first camera. In this implementation, the focal length of the first camera is adjusted according to the distance between the operating body and the first camera, or the first camera is switched to the second camera to capture an image of the operating body when the focal length of the first camera cannot be adjusted to correspond to the distance, such that the captured image of the operating body can be kept clear, thereby facilitating improving the accuracy of identifying the operating body, and further improving the accuracy of the air operation.

Figure 4:
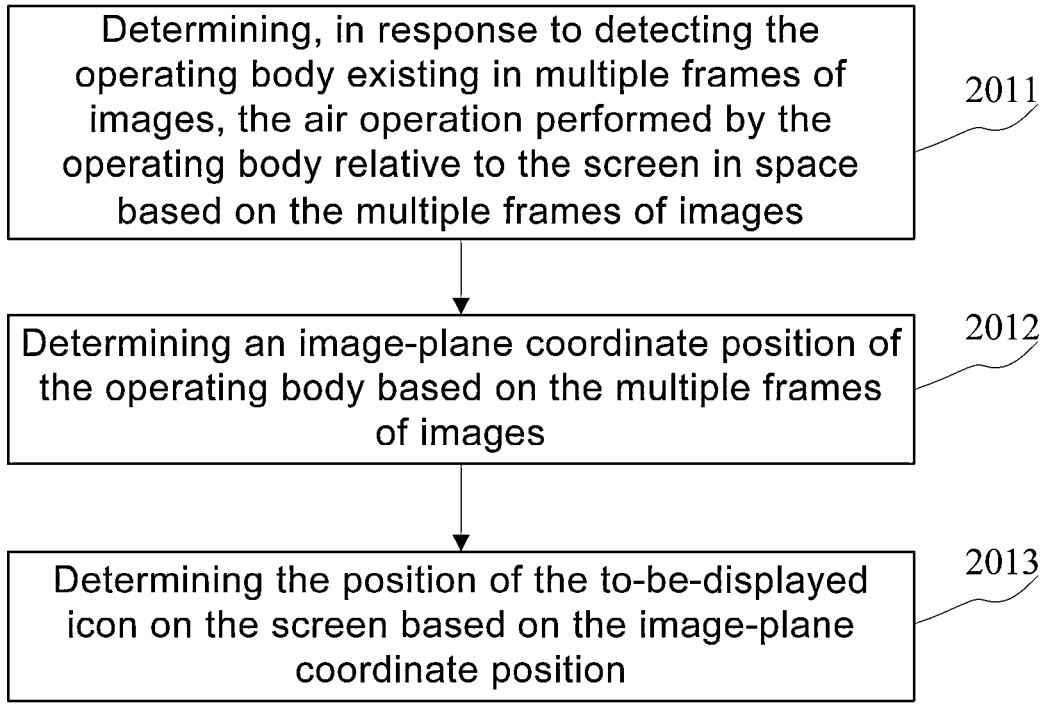
FIG. 4 is a schematic flowchart of a dynamic display method based on an operating body as provided by another exemplary embodiment of the present disclosure.

With further reference to FIG. 4, a schematic flowchart of still another embodiment of a dynamic display method based on an operating body is shown. As shown in FIG. 4, based on the above embodiment shown in FIG. 2, the step 201 may include the following steps 2011 to 2013.

In step 2011, in response to detecting the operating body existing in multiple frames of images, the air operation performed by the operating body relative to the screen in space is determined based on the multiple frames of images.

In this embodiment, the above-mentioned multiple frames of images can be captured by a monocular camera, and the number of frames included in the multiple frames of images can be arbitrarily set. For example, the multiple frames of images may include a currently captured frame image and a previous frame image.

Generally, when it is detected that an operating body appears in any one of the above-mentioned multiple frames of images, it can be determined that the operating body performs an air operation.

In step 2012, an image-plane coordinate position of the operating body is determined based on the multiple frames of images.

In this embodiment, the electronic device may identify the operating body for each of the multiple frames of images, and determine the image-plane coordinate position of the operating body in each frame image.

In step 2013, the position of the to-be-displayed icon on the screen is determined based on the image-plane coordinate position.

In this embodiment, the electronic device may determine a position on the screen, which corresponds to the image-plane coordinate position of the operating body in each frame image, as the position of the to-be-displayed icon according to a preset corresponding relationship between pixel points in an image captured by the monocular camera and pixel points of the screen.

It should be noted that, when this corresponding relationship is set, each pixel point in the above image can be set to correspond to a pixel point in the screen, or some pixel points in the image may also be set to correspond to pixel points in the screen. For example, a corresponding relationship between each pixel in a certain area of the image and each pixel in the screen may be set.

According to the method provided by the embodiment corresponding to FIG. 4, by using a camera to capture an image of the operating body and identifying the image to determine the position of the icon corresponding to the operating body on the screen, the required device is relatively low in cost and convenient to install. An image can be captured by a camera just by installing the camera in a specific position in space, such that the position of the icon on the screen can be determined in real time, which facilitates reducing the cost of an air operation system and improves the efficiency of the air operation.

Figure 5:
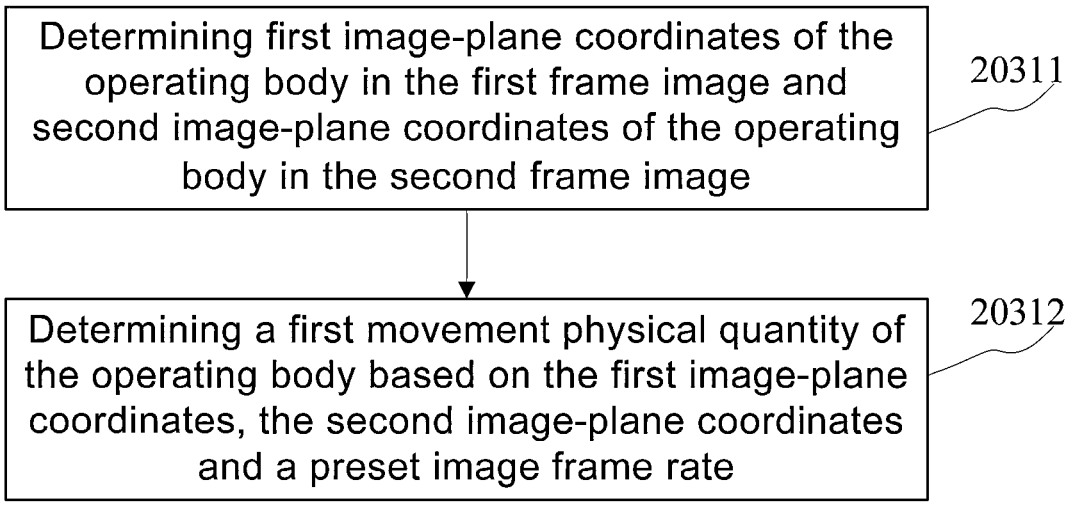
FIG. 5 is a schematic flowchart of a dynamic display method based on an operating body as provided by another exemplary embodiment of the present disclosure.

In some optional implementations, as shown in FIG. 5, based on the step 2021 to step 2023, the above step 203 may include the following steps 20311 to 20312.

In step 20311, first image-plane coordinates of the operating body in the first frame image and second image-plane coordinates of the operating body in the second frame image are determined.

The second frame image is an image spaced by a preset number of frames from the first frame image. The first frame image and the second frame image may be at least one frame image in the multiple frames of images described in step 2021 above, respectively. As an example, the second frame image may be a currently captured frame image; or the first frame image may also be a previous frame image. It should be noted that a method for determining the image-plane coordinates of the operating body in the image may be an existing target detection method, such as a target detection model based on a neural network, which will not be repeated here.

In step 20312, a first movement physical quantity of the operating body is determined based on the first image-plane coordinates, the second image-plane coordinates and a preset image frame rate.

The first movement physical quantity in this step is a movement physical quantity of the operating body in the image, wherein the movement physical quantity of the operating body includes, but is not limited to, at least one of a movement speed, a movement direction, and a movement range of the operating body in the image.

According to the method provided by the embodiment corresponding to FIG. 5, by determining image-plane coordinates of the operating body in two frame images, and determining the first movement physical quantity of the operating body in the images based on the image-plane coordinates, the process of determining the first movement physical quantity is simple and fast, thereby effectively improving the efficiency of the air operation.

Figure 6:
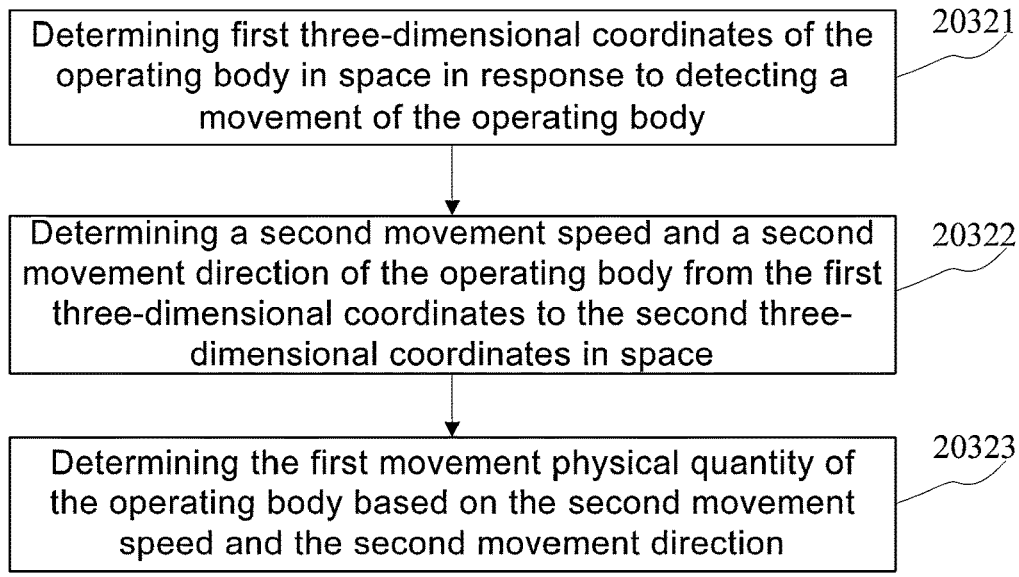
FIG. 6 is a schematic flowchart of a dynamic display method based on an operating body as provided by another exemplary embodiment of the present disclosure.

Further, referring to FIG. 6, a schematic flowchart of still another embodiment of a dynamic display method based on an operating body is shown. As shown in FIG. 6, based on the above embodiment shown in FIG. 2, the step 203 may specifically include the following steps 20321 to 20323.

In step 20321, first three-dimensional coordinates of the operating body in space are determined in response to the detection of a movement of the operating body.

In this embodiment, a three-dimensional detection device such as a binocular stereo camera or LIDAR may be used to acquire corresponding types of data frames in real time; and a coordinate position of the operating body in a three-dimensional space may be detected in real time according to the data frames. A method for determining the coordinate position of the operating body in the three-dimensional space according to the data frames is a prior art, which will not be repeated here. When a change in the three-dimensional coordinates of the operating body is detected, it can be determined that the operating body has moved. Then, the three-dimensional coordinates corresponding to the current data frame when the movement of the operating body is detected can be regarded as first three-dimensional coordinates; or three-dimensional coordinates corresponding to the previous data frame when the movement of the operating body is detected can be regarded as first three-dimensional coordinates.

In step 20322, a second movement speed and a second movement direction of the operating body from the first three-dimensional coordinates to second three-dimensional coordinates in space are determined.

In this embodiment, the second three-dimensional coordinates may be determined according to a data frame following the current data frame or the previous data frame corresponding to the first three-dimensional coordinates. Further, the movement speed and the movement direction of the operating body in space may be determined as the second movement speed and the second movement direction according to the first three-dimensional coordinates and the second three-dimensional coordinates.

For example, the first three-dimensional coordinates are $(X1, Y1, Z1)$, and the second three-dimensional coordinates are $(X2, Y2, Z2)$. A time from $(X1, Y1, Z1)$ to $(X2, Y2, Z2)$ may be determined based on a frame rate at which image data is acquired. Then, the movement speed and the movement direction of the operating body in space are determined based on a spatial geometric relationship between $(X1, Y1, Z1)$ and $(X2, Y2, Z2)$. And then, the second movement speed and the second movement direction are further determined based on the obtained movement speed and movement direction; for example, the obtained movement speed and movement direction are determined as the second movement speed and the second movement direction.

In step 20323, the first movement physical quantity of the operating body is determined based on the second movement speed and the second movement direction.

In this embodiment, the first movement physical quantity may include the above-mentioned second movement speed and second movement direction, and may also include other physical quantities, such as a movement range.

According to the method provided by the embodiment corresponding to FIG. 6, the first movement physical quantity in space is determined by detecting the three-dimensional coordinates of the operating body in space, such that the movement state of the operating body in space can be reflected accurately, which facilitates further displaying the icon at the corresponding position on the screen according to the first movement physical quantity, thereby making the process of the air operation closer to the actual situation in space, improving the accuracy of the air operation and further improving the user's sense of control.

In some optional implementations, based on the steps 20321 to 20323, the above step 204 may include the following sub-steps.

Firstly, a third movement speed and a third movement direction on the screen respectively corresponding to the second movement speed and the second movement direction are determined based on a preset mapping relationship between a target space range and a display range of the screen.

The above-mentioned device for detecting the three-dimensional coordinates of the operating body may be the three-dimensional detection device described in the above step 20321. The target space range is a space detection range of the device for detecting the three-dimensional coordinates of the operating body. It should be noted that the target space range may be the entire space detection range of the above-mentioned three-dimensional detection device, or may be a part of the space detection range included in the preset entire space detection range.

In this embodiment, the electronic device may determine the third movement speed and the third movement direction according to a preset corresponding relationship between points within the target space range and the pixel points of the screen. For example, a first point and a second point respectively mapped by the first three-dimensional coordinates and the second three-dimensional coordinates to the screen are determined according to this corresponding relationship; and the movement speed and the movement direction of the icon on the screen may be determined as the third movement speed and the third movement direction according to the coordinates of the first point and the second point and the movement time.

Then, the second movement physical quantity of the icon on the screen is determined based on the third movement speed and the third movement direction. The second movement physical quantity may include the above-mentioned third movement speed and third movement direction, and may also include other physical quantities, such as the movement range of the icon.

In this implementation, the third movement speed and the third movement direction of the icon on the screen are determined according to a preset mapping relationship between the target space range and the display range of the screen, such that the second movement physical quantity can accurately reflect a movement state of the operating body in the three-dimensional space, thereby facilitating improving the accuracy of the air operation.

Figure 7:
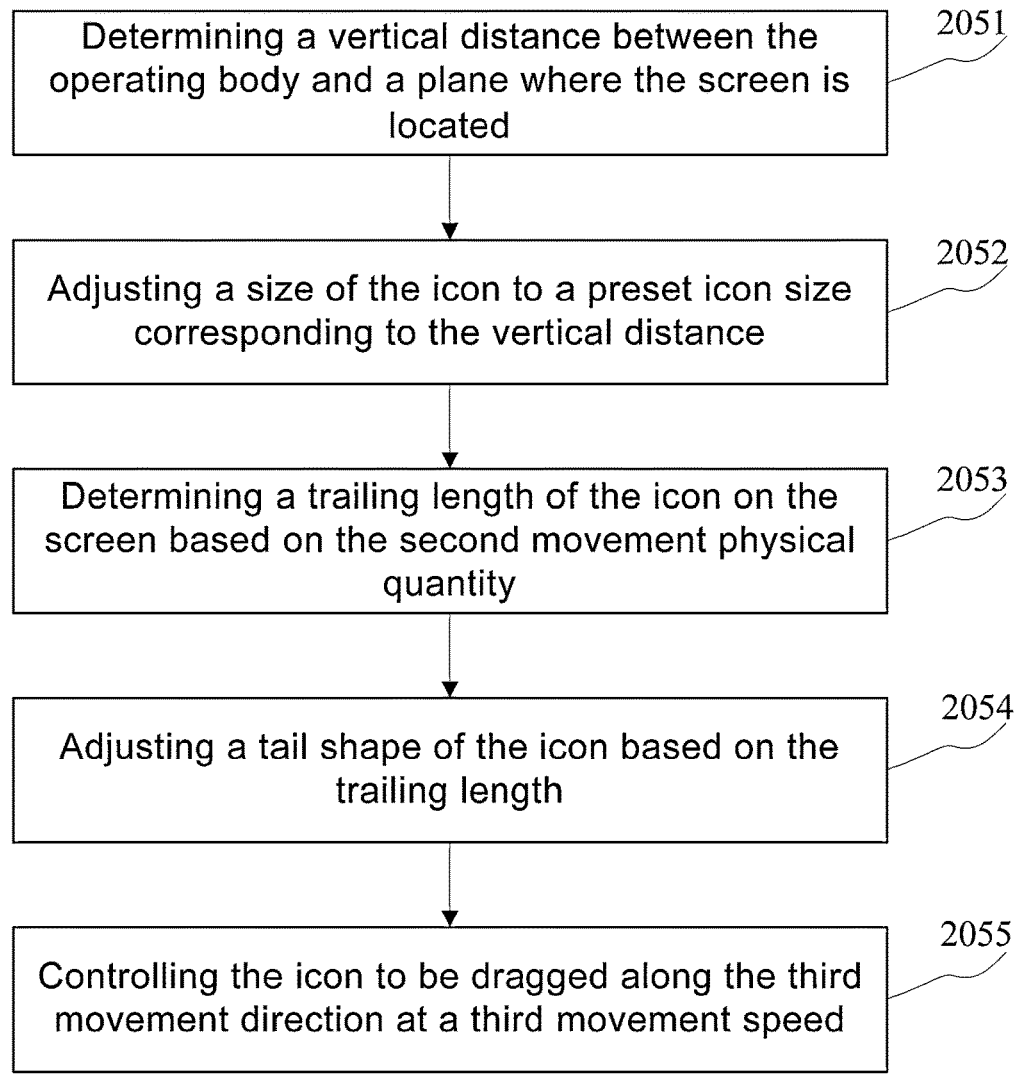
FIG. 7 is a schematic flowchart of a dynamic display method based on an operating body as provided by another exemplary embodiment of the present disclosure.

In some optional implementations, as shown in FIG. 7, based on the above optional implementation, the step 205 may include the following sub-steps 2051 to 2055.

In step 2051, a vertical distance between the operating body and a plane where the screen is located is determined.

The vertical distance can be obtained according to various existing ranging methods. For example, the above-mentioned three-dimensional detection device, an infrared rangefinder, an ultrasonic rangefinder or other ranging device may be used to determine the vertical distance between the operating body and the plane where the screen is located.

In step 2052, a size of the icon is adjusted to a preset icon size corresponding to the vertical distance.

A corresponding relationship between the icon size (i.e. the size of the icon) and the vertical distance may be preset; and the electronic device may determine the icon size corresponding to the current vertical distance according to this corresponding relationship. Generally, the smaller the above-mentioned vertical distance is, the larger the size of the icon is. Therefore, an effect of pressing the screen by the operating body can be simulated.

In step 2053, a trailing length of the icon on the screen is determined based on the second movement physical quantity.

Specifically, the trailing length of the icon on the screen is determined based on the third movement direction and the third movement speed, wherein the trailing length varies with the magnitude of the third movement speed.

The concept of the trailing length in this step is the same as the concept of the trailing length described in the optional implementation of the embodiment corresponding to FIG. 2, and it is not repeated here.

In step 2054, a tail shape of the icon is adjusted based on the trailing length.

The concept of the tail shape in this step is the same as the concept of the tail shape described in the optional implementation of the embodiment corresponding to FIG. 2, and it is not repeated here.

In step 2055, the icon is controlled to be dragged along the third movement direction at the third movement speed.

In this implementation, the size of the icon can be adjusted according to the distance between the operating body and the screen while displaying a trailing tail with a corresponding length when the icon moves, and an effect of pressing the screen by the operating body in the movement process of the operating body is simulated, such that the user can visually feel the weight sense of the air operation, thereby further improving the user's sense of control.

It should be noted that the method of dynamically displaying the icon by means of the operating body as described in the present disclosure is to reflect the weight sense of the operating body in terms of a visual effect. It should be understood that the present disclosure may also be based on any combination of icon, voice, text, etc. For example, when the icon is dragged on the screen, a voice effect for prompting the operating body can also be determined based on the second movement physical quantity, and is then played. For example, the higher the movement speed included in the second movement physical quantity is, the greater the volume representing the voice effect is, thereby further improving the controllability of the operating body. For another example, when the icon is dragged on the screen, a text message for prompting the operating body may be generated based on the second movement physical quantity, and the text message is displayed on the screen.

Exemplary Apparatus

Figure 8:
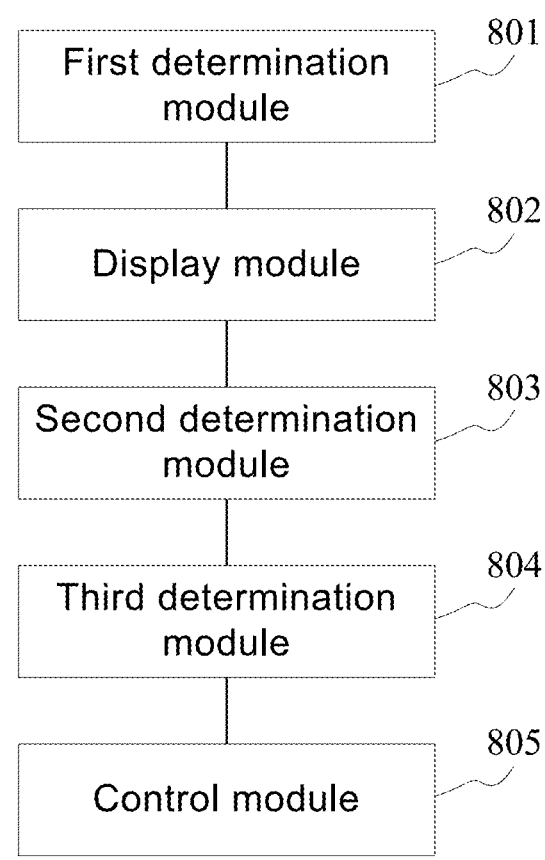
FIG. 8 is a schematic structural diagram of a dynamic display apparatus based on an operating body as provided by an exemplary embodiment of the present disclosure.
Figure 9:
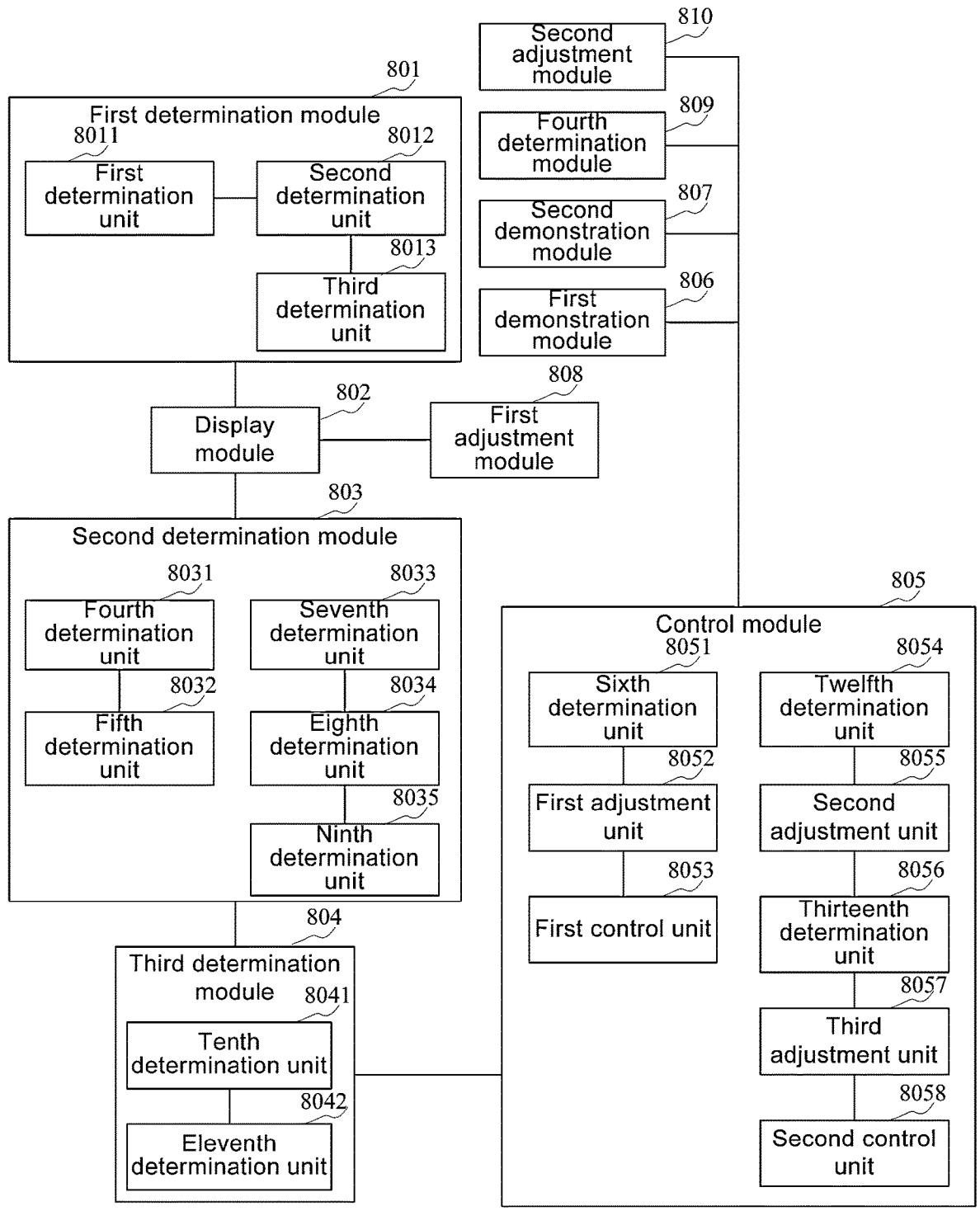
FIG. 9 is a schematic structural diagram of a dynamic display apparatus based on an operating body as provided by another exemplary embodiment of the present disclosure.

FIG. 8 is a schematic structural diagram of a dynamic display apparatus based on an operating body as provided by an exemplary embodiment of the present disclosure. This embodiment may be applied to an electronic device. As shown in FIG. 8, the dynamic display apparatus based on the operating body includes a first determination module 801, a display module 802, a second determination module 803, a third determination module 804 and a control module 805, wherein the first determination module 801 is configured to determine a position of a to-be-displayed icon on a screen in response to an air operation performed by the operating body relative to the screen in space, wherein the operating body is a user's body part or an object with a specific shape; the display module 802 is configured to display the icon at the position determined by the first determination module 801; the second determination module 803 is configured to determine a first movement physical quantity of the operating body in response to the detection of a movement of the operating body; the third determination module 804 is configured to determine a second movement physical quantity of the icon on the screen based on the first movement physical quantity determined by the second determination module 803; and the control module 805 is configured to control the icon to be dragged on the screen based on the second movement physical quantity determined by the third determination module 804. The first movement physical quantity is an actual physical quantity of the operating body in space, or a physical quantity of the operating body mapped into a captured image.

In this embodiment, the first determination module 801 may determine the position of the to-be-displayed icon on the screen in response to the air operation performed by the operating body relative to the screen in space. The operating body is a variety of objects that perform air operations on a controlled device. For example, the operating body may be a body part such as a user's hand or head, or may be an object, such as a somatosensory handle, that can output position information to the above-mentioned apparatus in real time, or may be other object with a specific shape.

The first determination module 801 may determine the position of the operating body in real time based on various methods. Generally, the first determination module 801 may acquire to-be-identified data acquired for the operating body by the operating body position acquisition device 104 as shown in FIG. 1, and identify the to-be-identified data, thereby determining the position of the operating body. As an example, the operating body position acquisition device 104 may be a monocular camera; and the first determination module 801 may identify an image frame acquired by the monocular camera in real time, and determine a position of the operating body in the image frame. For another example, the operating body position acquisition device 104 may be a binocular stereo camera; and the first determination module 801 may identify a binocular image acquired by the binocular stereo camera in real time, and determine a position of the operating body in a three-dimensional space.

The first determination module 801 may map the determined position of the operating body to a corresponding position on the screen as the position of the to-be-displayed icon on the screen. The screen may be a screen included in this apparatus, or may be a screen included in a device connected to this apparatus. For example, the screen may be a screen of a center console on a vehicle. Generally, a corresponding relationship between the position of the operating body and the position on the screen may be preset, and the position of the operating body is mapped to the screen according to this corresponding relationship.

In this embodiment, the first determination module 801 may determine in real time whether the operating body performs an air operation in space. For example, when it is detected that the operating body appears within a detection range of the operating body position acquisition device 104 or the operating body moves within the detection range of the operating body position acquisition device 104, the operating body is determined to perform the air operation.

In this embodiment, the display module 802 may display the to-be-displayed icon at the position of the to-be-displayed icon on the screen. The icon may be of various types and shapes. For example, the icon may be a static image or a dynamic image. The shape of the icon may be a fixed shape or a shape that changes in real time. As an example, the icon may be an icon in the shape of a water drop; and the icon may be a dynamic graph representing a shaking state of the water drop.

In this embodiment, the second determination module 803 may determine a first movement physical quantity of the operating body in response to the detection of the movement of the operating body. The first movement physical quantity may include, but is not limited to, at least one of the followings: a movement speed, a movement direction, a movement range, and the like. It should be noted that the first movement physical quantity may be an actual physical quantity of the operating body in space, or may be a physical quantity of the operating body mapped to other dimensions (e.g., a two-dimensional image plane or a three-dimensional virtual space).

As an example, when the operating body position acquisition device 104 is a monocular camera, the first movement physical quantity may be a physical quantity of the operating body mapped into an image captured by the monocular camera. As another example, when the operating body position acquisition device 104 is a three-dimensional detection device such as LIDAR, the first movement physical quantity may be an actual physical quantity of the operating body in space.

In this embodiment, the third determination module 804 may also be configured to determine the second movement physical quantity of the icon on the screen based on the first movement physical quantity. Specifically, the third determination module 804 may determine the second movement physical quantity of the icon on the screen according to a preset mapping relationship between a dimension of the first movement physical quantity and the screen. The second movement physical quantity may include, but is not limited to, at least one of the followings: a movement speed, a movement direction, a movement range, and the like.

In this embodiment, the control module 805 may control the icon to be dragged on the screen based on the second movement physical quantity. During the dragging process, the icon can remain unchanged in shape, or can produce a preset dynamic effect, such as trailing or deformation.

FIG. 8 is a schematic structural diagram of a dynamic display apparatus based on an operating body as provided by another exemplary embodiment of the present disclosure.

In some optional implementations, the first determination module 801 may include: a first determination unit 8011 configured to, in response to detecting an operating body existing in multiple frames of images, determine an air operation performed by the operating body relative to the screen in space based on the multiple frames of images; a second determination unit 8012 configured to determine an image-plane coordinate position of the operating body based on the multiple frames of images; and a third determination unit 8013 configured to determine a position of the to-be-displayed icon on the screen based on the image-plane coordinate position.

In some optional implementations, the second determination module 803 may include: a fourth determination unit 8031 configured to determine first image-plane coordinates of the operating body in the first frame image and second image-plane coordinates of the operating body in the second frame image, wherein the second frame image is an image spaced by a preset number of frames from the first frame image; and a fifth determination unit 8032 configured to determine a first movement physical quantity of the operating body based on the first image-plane coordinates, the second image-plane coordinates and a preset image frame rate.

In some optional implementations, the second movement physical quantity includes a first movement direction and a first movement speed. The control module 805 may include:

a sixth determination unit 8051 configured to determine a trailing length of the icon on the screen, the first movement direction and the first movement speed based on the second movement physical quantity, wherein the trailing length varies with the magnitude of the first movement speed; a first adjustment unit 8052 configured to adjust a tail shape of the icon based on the trailing length; and a first control unit 8053 configured to control the icon to be dragged along the first movement direction at the first movement speed.

In some optional implementations, the second determination module 803 may include: a seventh determination unit 8033 configured to determine first three-dimensional coordinates of the operating body in space in response to the detection of the movement of the operating body, wherein the first three-dimensional coordinates are three-dimensional coordinates of the operating body corresponding to a current data frame when the operating body moves, or the first three-dimensional coordinates are three-dimensional coordinates of the operating body corresponding to a previous data frame when the operating body moves; an eighth determination unit 8034 configured to determine second three-dimensional coordinates of the operating body in space, wherein the second three-dimensional coordinates are three-dimensional coordinates of the operating body corresponding to a data frame after the current data frame or the previous data frame during the movement of the operating body; and a ninth determination unit 8035 configured to determine a second movement speed and a second movement direction of the operating body in space based on the first three-dimensional coordinates and the second three-dimensional coordinates, and determine the first movement physical quantity of the operating body based on the second movement speed and the second movement direction.

In some optional implementations, the third determination module 804 may include: a tenth determination unit 8041 configured to determine a third movement speed and a third movement direction on the screen respectively corresponding to the second movement speed and the second movement direction based on a preset mapping relationship between a target space range and a display range of the screen, wherein the target space range is a space detection range of a device for detecting three-dimensional coordinates of the operating body; and an eleventh determination unit 8042 configured to determine a second movement physical quantity of the icon on the screen based on the third movement speed and the third movement direction.

In some optional implementations, the control module 805 may include: a twelfth determination unit 8054 configured to determine a vertical distance between the operating body and a plane where the screen is located; a second adjustment unit 8055 configured to adjust a size of the icon to a preset icon size corresponding to the vertical distance; a thirteenth determination unit 8056 configured to determine a trailing length of the icon on the screen based on the third movement direction and the third movement speed in the second movement physical quantity, wherein the trailing length varies with the magnitude of the third movement speed; a third adjustment unit 8057 configured to adjust a tail shape of the icon based on the trailing length; and a second control unit 8058 configured to control the icon to be dragged along the third movement direction at the third movement speed.

In some optional implementations, the apparatus may further include: a first demonstration module 806 configured to demonstrate, at the current display position of the icon on the screen, a shape change of the icon according to a first preset animation when it is detected that the operating body leaves a detection boundary of a device for detecting the air operation of the operating body, wherein the device is configured to detect the air operation of the operating body.

In some optional implementations, the apparatus may further include: a second demonstration module 807 configured to, in response to the determination of a movement speed of the operating body, such as the second movement speed, according to the first movement physical quantity, demonstrate, at the current display position of the icon on the screen, the shape change of the icon according to a second preset animation if the second movement speed is greater than or equal to a first preset speed. The first movement physical quantity here includes the second movement speed.

In some optional implementations, the apparatus may further include: a first adjustment module 808 configured to, in response to the determination of a movement speed of the icon, e.g., the first movement speed, according to the second movement physical quantity, adjust a display size of a main body of the icon on the screen based on a vertical distance between the operating body and the plane where the screen is located if the first movement speed of the icon is less than or equal to a second preset speed. The second movement physical quantity here includes the first movement speed.

In some optional implementations, the apparatus may further include: a fourth determination module 809 configured to, in the case that the device for detecting the air operation of the operating body is a first camera, determine a distance between the operating body and the first camera; and a second adjustment module 810 configured to determine a target focal length corresponding to the distance according to a preset corresponding relationship between the distance and a focal length of the first camera, and adjust the focal length of the first camera to the target focal length; or in the case that the target focal length exceeds a maximum focal length of the first camera, switch the first camera to a second camera, adjust a focal length of the second camera to the target focal length, and acquire an image of the operating body by the second camera. The maximum focal length of the second camera is greater than the maximum focal length of the first camera, and the maximum focal length of the second camera is greater than or equal to the target focal length.

According to the dynamic display apparatus based on the operating body as provided by the above embodiment of the present disclosure, when the operating body performs the air operation in space, the position of the icon mapped by the operating body on the screen is determined; the first movement physical quantity of the operating body is determined in response to the detection of the movement of the operating body; the second movement physical quantity of the icon on the screen is determined based on the first movement physical quantity; and finally, the icon is controlled to be dragged on the screen based on the second movement physical quantity. As a result, a moving track of the operating body can be fed back in real time by dragging the icon on the screen when the operating body performs the air operation, such that a user can know whether the air operation is accurate or not in real time according to the moving track of the icon, which improves the user's sense of control and facilitates improving the accuracy of the air operation.

Exemplary Electronic Device

Hereinafter, an electronic device according to an embodiment of the present disclosure will be described with reference to FIG. 10. The electronic device may be any one or both of the terminal device 101 and the server 103 as shown in FIG. 1, or a stand-alone device independent of them, wherein the stand-alone device may communicate with the terminal device 101 and the server 103 to receive input signals acquired from the terminal device 101 and the server 103.

Figure 10:
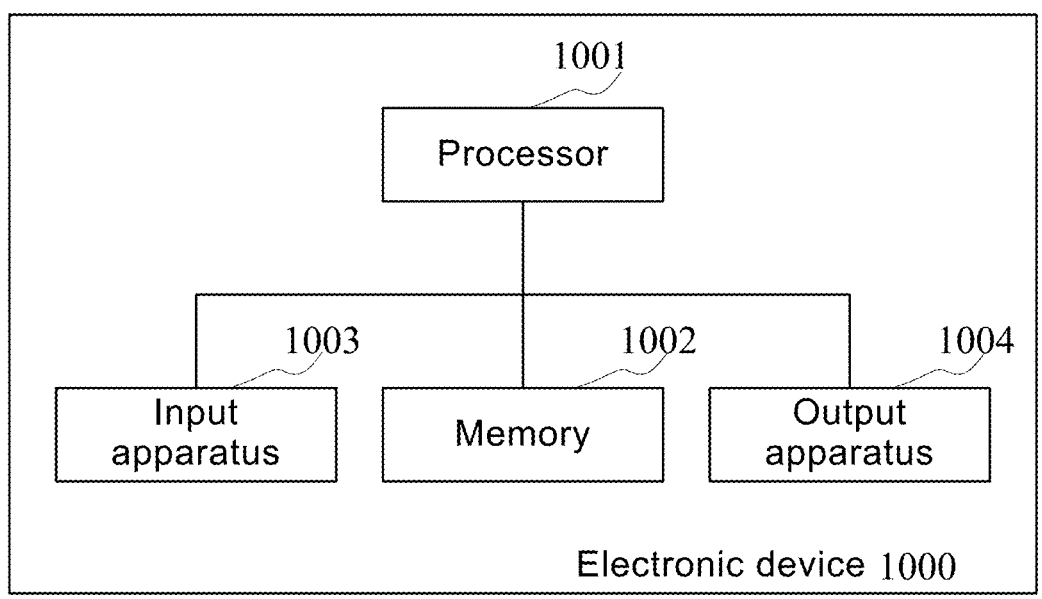
FIG. 10 is a structural diagram of an electronic device as provided by an embodiment of the present disclosure.

FIG. 10 is a block diagram of an electronic device according to an embodiment of the present disclosure.

As shown in FIG. 10, the electronic device 1000 includes one or more processors 1001 and a memory 1002.

The processor 1001 may be a central processing unit (CPU) or other form of processing units with data processing capability and/or instruction execution capability, and may control other components in the electronic device 1000 to perform desired functions.

The memory 1002 may include one or more computer program products, which may include various forms of computer-readable storage media, such as a volatile memory and/or a non-volatile memory. The volatile memory may include, for example, a random access memory (RAM) and/or a cache memory, etc. The non-volatile memory may include, for example, a read only memory (ROM), a hard disk, a flash memory, etc. The computer-readable storage medium may store one or more computer program instructions therein; and the processor 1001 may operate the program instructions to implement the dynamic display methods based on the operating body according to the respective embodiments of the present disclosure and/or other desired functions. The computer-readable storage medium may also store various contents such as to-be-identified data and movement physical quantities therein.

In an example, the electronic device 1000 may also include an input apparatus 1003 and an output apparatus 1004, both of which are interconnected by a bus system and/or other forms of connection mechanism (not shown).

For example, when the electronic device is the terminal device 101 or the server 103, the input apparatus 1003 may be a camera, LIDAR, etc., for inputting the to-be-identified data acquired for the operating body. When the electronic device is a stand-alone device, the input apparatus 1003 may be a communication network connector configured to receive the input to-be-identified data from the terminal device 101 and the server 103.

The output apparatus 1004 may output various information to the outside, including a second movement physical quantity and the like. The output apparatus 1004 may include, for example, a display, a speaker, a printer, and a communication network and a remote output device connect to it, etc.

Of course, for the sake of simplicity, only some of the components in the electronic device 1000 related to the present disclosure are shown in FIG. 10, and components such as a bus and an input/output interface are omitted. In addition, the electronic device 1000 may also include any other appropriate components according to specific applications.

Exemplary Computer Program Product and Computer-Readable Storage Medium

In addition to the methods and devices described above, an embodiment of the present disclosure may also be a computer program product including computer program instructions, wherein the computer program instructions, when operated by a processor, cause the processor to perform the steps in the dynamic display methods based on the operating body according to various embodiments of the present disclosure described in the above-mentioned "Exemplary Method" section of this specification.

The computer program product may compile program codes for performing the operations of embodiments of the present disclosure in any combination of one or more programming languages, wherein the programming languages include object-oriented programming languages, such as Java and C++, as well as conventional procedural programming languages, such as the "C" language or similar programming languages. The program codes may be executed entirely on a user's computing device, partly on a user device, as a stand-alone software package, partly on a user's computing device and partly on a remote computing device, or entirely on a remote computing device or a server.

In addition, an embodiment of the present disclosure may also be a computer-readable storage medium configured to store computer program instructions therein, wherein the computer program instructions, when operated by a processor, cause the processor to perform the steps in the dynamic display methods based on the operating body according to various embodiments of the present disclosure described in the above-mentioned "Exemplary Method" section of this specification.

The computer-readable storage medium may employ any combination of one or more readable media. The readable medium may be a readable signal medium or a readable storage medium. The readable storage medium may include, for example, but not limited to, electrical, magnetic, optical, electromagnetic, infrared, or semiconductor systems, apparatuses or means, or any combination thereof. More specific examples (non-exhaustive lists) of the readable storage medium include: an electric connector having one or more leads, a portable computer disk, a hard disk, a random access memory (RAM), a read-only memory (ROM), an erasable programmable read-only memory (EPROM) or a flash memory, an optical fiber, a portable compact disk read-only memory (CD-ROM), optical storage means, magnetic storage means, or any suitable combination thereof.

The basic principles of the present disclosure have been described above in conjunction with specific embodiments. However, it should be pointed out that the merits, advantages, effects, etc. mentioned in the present disclosure are only exemplary and not limitative, and thus cannot be considered that these merits, advantages, effects, etc. are necessary for the respective embodiments of the present disclosure. In addition, the specific details disclosed above are only for an exemplary purpose and easy understanding, but not for limitation. The above details do not limit the present disclosure to be necessarily implemented by the above specific details.

The respective embodiments in the present description are described in a progressive manner, the focus of each embodiment illustrates the differences from other embodiments, and the same or similar parts among the embodiments may refer to one another. For the system embodiments, since they are basically similar to the method embodiments, the description is relatively simple. For related parts, please refer to the part of the description of the method embodiments.

The block diagrams of means, apparatus, devices and systems mentioned in the present disclosure are merely illustrative examples and are not intended to require or imply that they must be connected, arranged, or configured in the manners shown in the block diagrams. As those skilled in the art will appreciate, these means, apparatuses, devices and systems may be connected, arranged or configured in any manner. Words such as "comprising", "including", "having" and the like are open-ended words which mean "including but not limited to" and are used interchangeably therewith. As used herein, the words "or" and "and" refer to the words "and/or" and are used interchangeably therewith unless the context clearly dictates otherwise. As used herein, the words "such as" and "for example" refers to the phrase "such as but not limited to" and are used interchangeably therewith.

The methods and apparatuses of the present disclosure may be implemented in many ways. For example, the methods and apparatuses of the present disclosure can be implemented by software, hardware or firmware, or any combination thereof. The above-described order of steps of the method is for illustration only, and the steps of the method of the present disclosure are not limited to the order specifically described above unless specifically stated otherwise. Furthermore, in some embodiments, the present disclosure can also be implemented as programs recorded in a recording medium, these programs including machine-readable instructions for implementing the methods according to the present disclosure. Thus, the present disclosure also encompasses a recording medium storing programs for executing the methods according to the present disclosure.

Further, it should be noted that in the apparatuses, devices and methods of the present disclosure, the respective parts or steps can be decomposed and/or recombined. These decomposed and/or recombined solutions should be regarded as equivalent solutions of the present disclosure.

The above description of the disclosed aspects is provided to enable any person skilled in the art to make or use the present disclosure. Various modifications to these aspects will be readily apparent to those skilled in the art, and the generic principles defined herein may be applied to other aspects without departing from the scope of the present disclosure. Thus, the present disclosure is not intended to be limited to the aspects shown herein but is to conform the widest scope consistent with the principles and novel features disclosed herein.

The foregoing description has been presented for the purposes of illustration and description. Furthermore, this description is not intended to limit embodiments of the present disclosure to the forms disclosed herein. Although a number of example aspects and embodiments have been discussed above, those skilled in the art will recognize certain variations, modifications, changes, additions and sub-combinations thereof.

What is claimed is:

1. A dynamic display method based on an operating body, comprising:
   determining a position of a to-be-displayed icon on a screen in response to an air operation performed by the operating body relative to the screen in space, wherein the operating body is a user's body part or an object with a specific shape;
   displaying the icon at the determined position;
   determining a first movement physical quantity of the operating body in response to detecting a movement of the operating body, wherein the first movement physical quantity is an actual physical quantity of the operating body in space, or a physical quantity of the operating body mapped into a captured image;
   determining a second movement physical quantity of the icon on the screen based on the first movement physical quantity; and
   controlling the icon to be dragged on the screen based on the second movement physical quantity,
   wherein the second movement physical quantity comprises a first movement direction and a first movement speed; and
   the step of controlling the icon to be dragged on the screen based on the second movement physical quantity comprises:
   determining a trailing length of the icon on the screen based on the first movement direction and the first movement speed, wherein the trailing length varies with magnitude of the first movement speed;
   adjusting a tail shape of the icon based on the trailing length; and
   controlling the icon to be dragged along the first movement direction at the first movement speed,
   wherein the method further comprises demonstrating, at the current position of the icon on the screen, a shape change of the icon according to a first preset animation when it is detected that the operating body leaves a detection boundary of a device for detecting the air operation of the operating body,
   wherein the shape of the icon is in a shape of a water drop, the first preset animation is an animation representing that the water drop is crushed,
   wherein the first movement physical quantity comprises a second movement speed, and the method further comprises:
   demonstrating, at the current position of the icon on the screen, a shape change of the icon according to a second preset animation if the second movement speed is greater than or equal to a first preset speed, to prompt the user to adjust the second movement speed of the operating body to a preset normal speed range, wherein the second preset animation is an animation representing a water drop cracking process, and a speed at which the water drop is cracked and a cracking degree of the water drop are positively related to the second movement speed.

2. The method according to claim 1, wherein the step of determining the position of the to-be-displayed icon on the screen in response to the air operation performed by the operating body relative to the screen in space comprises:
   determining, in response to detecting the operating body existing in multiple frames of images, the air operation performed by the operating body relative to the screen in space based on the multiple frames of images;
   determining an image-plane coordinate position of the operating body based on the multiple frames of images; and
   determining the position of the to-be-displayed icon on the screen based on the image-plane coordinate position.

3. The method according to claim 2, wherein the step of determining the first movement physical quantity of the operating body in response to detecting the movement of the operating body comprises:
   determining first image-plane coordinates of the operating body in a first frame image and second image-plane coordinates of the operating body in a second frame image, wherein the second frame image is an image spaced by a preset number of frames from the first frame image; and
   determining the first movement physical quantity of the operating body based on the first image-plane coordinates, the second image-plane coordinates and a preset image frame rate.

4. The method according to claim 1, wherein the method further comprises:
   adjusting a display size of a main body of the icon on the screen based on a vertical distance between the operating body and a plane where the screen is located if the first movement speed is less than or equal to a second preset speed.

5. The method according to claim 1, further comprising:
in a case that the device for detecting the air operation of the operating body is a first camera, determining a distance between the operating body and the first camera;
determining a target focal length corresponding to the distance according to a preset corresponding relationship between the distance and a focal length;
adjusting a focal length of the first camera to the target focal length; or
in a case that the target focal length exceeds a maximum focal length of the first camera, switching the first camera to a second camera, and adjusting a focal length of the second camera to the target focal length, wherein a maximum focal length of the second camera is greater than the maximum focal length of the first camera.

6. A non-transitory computer-readable storage medium, which is configured to store a computer program therein, wherein the computer program is configured to perform a dynamic display method based on an operating body comprising:
determining a position of a to-be-displayed icon on a screen in response to an air operation performed by the operating body relative to the screen in space, wherein the operating body is a user's body part or an object with a specific shape;
displaying the icon at the determined position;
determining a first movement physical quantity of the operating body in response to detecting a movement of the operating body, wherein the first movement physical quantity is an actual physical quantity of the operating body in space, or a physical quantity of the operating body mapped into a captured image;
determining a second movement physical quantity of the icon on the screen based on the first movement physical quantity; and
controlling the icon to be dragged on the screen based on the second movement physical quantity,
wherein the second movement physical quantity comprises a first movement direction and a first movement speed; and
the step of controlling the icon to be dragged on the screen based on the second movement physical quantity comprises:
determining a trailing length of the icon on the screen based on the first movement direction and the first movement speed, wherein the trailing length varies with magnitude of the first movement speed;
adjusting a tail shape of the icon based on the trailing length; and
controlling the icon to be dragged along the first movement direction at the first movement speed,
wherein the method further comprises demonstrating, at the current position of the icon on the screen, a shape change of the icon according to a first preset animation when it is detected that the operating body leaves a detection boundary of a device for detecting the air operation of the operating body,
wherein the shape of the icon is in a shape of a water drop, the first preset animation is an animation representing that the water drop is crushed,
wherein the first movement physical quantity comprises a second movement speed, and the method further comprises:

demonstrating, at the current position of the icon on the screen, a shape change of the icon according to a second preset animation if the second movement speed is greater than or equal to a first preset speed, to prompt the user to adjust the second movement speed of the operating body to a preset normal speed range, wherein the second preset animation is an animation representing a water drop cracking process, and a speed at which the water drop is cracked and a cracking degree of the water drop are positively related to the second movement speed.

7. The non-transitory computer-readable storage medium according to claim 6, wherein the step of determining the position of the to-be-displayed icon on the screen in response to the air operation performed by the operating body relative to the screen in space comprises:
determining, in response to detecting the operating body existing in multiple frames of images, the air operation performed by the operating body relative to the screen in space based on the multiple frames of images;
determining an image-plane coordinate position of the operating body based on the multiple frames of images; and
determining the position of the to-be-displayed icon on the screen based on the image-plane coordinate position.

8. The non-transitory computer-readable storage medium according to claim 6, the method further comprises:
adjusting a display size of a main body of the icon on the screen based on a vertical distance between the operating body and a plane where the screen is located if the first movement speed is less than or equal to a second preset speed.

9. The non-transitory computer-readable storage medium according to claim 6, wherein the method further comprises:
in a case that the device for detecting the air operation of the operating body is a first camera, determining a distance between the operating body and the first camera;
determining a target focal length corresponding to the distance according to a preset corresponding relationship between the distance and a focal length;
adjusting a focal length of the first camera to the target focal length; or
in a case that the target focal length exceeds a maximum focal length of the first camera, switching the first camera to a second camera, and adjusting a focal length of the second camera to the target focal length, wherein a maximum focal length of the second camera is greater than the maximum focal length of the first camera.

10. An electrical device, comprising:
a processor; and
a memory configured to store instructions executable by the processor,
wherein the processor is configured to read the executable instructions from the memory and implement a dynamic display method based on an operating body comprising:
determining a position of a to-be-displayed icon on a screen in response to an air operation performed by the operating body relative to the screen in space, wherein the operating body is a user's body part or an object with a specific shape;
displaying the icon at the determined position;
determining a first movement physical quantity of the operating body in response to detecting a movement of the operating body, wherein the first movement physical quantity is an actual physical quantity of the operating body in space, or a physical quantity of the operating body mapped into a captured image;

determining a second movement physical quantity of the icon on the screen based on the first movement physical quantity; and controlling the icon to be dragged on the screen based on the second movement physical quantity, wherein the second movement physical quantity comprises a first movement direction and a first movement speed; and the step of controlling the icon to be dragged on the screen based on the second movement physical quantity comprises:

determining a trailing length of the icon on the screen based on the first movement direction and the first movement speed, wherein the trailing length varies with magnitude of the first movement speed;

adjusting a tail shape of the icon based on the trailing length; and controlling the icon to be dragged along the first movement direction at the first movement speed, wherein the method further comprises demonstrating, at the current position of the icon on the screen, a shape change of the icon according to a first preset animation when it is detected that the operating body leaves a detection boundary of a device for detecting the air operation of the operating body, wherein the shape of the icon is in a shape of a water drop, the first preset animation is an animation representing that the water drop is crushed, wherein the first movement physical quantity comprises a second movement speed, and the method further comprises:

demonstrating, at the current position of the icon on the screen, a shape change of the icon according to a second preset animation if the second movement speed is greater than or equal to a first preset speed, to prompt the user to adjust the second movement speed of the operating body to a preset normal speed range; wherein the second preset animation is an animation representing a water drop cracking process, and a speed at which the water drop is cracked and a cracking degree of the water drop are positively related to the second movement speed.

11. The electrical device according to claim 10, wherein the step of determining the position of the to-be-displayed icon on the screen in response to the air operation performed by the operating body relative to the screen in space comprises:

determining, in response to detecting the operating body existing in multiple frames of images, the air operation performed by the operating body relative to the screen in space based on the multiple frames of images;

determining an image-plane coordinate position of the operating body based on the multiple frames of images; and determining the position of the to-be-displayed icon on the screen based on the image-plane coordinate position.

12. The electrical device according to claim 10, wherein the method further comprises:

in a case that the device for detecting the air operation of the operating body is a first camera, determining a distance between the operating body and the first camera;

determining a target focal length corresponding to the distance according to a preset corresponding relationship between the distance and a focal length;

adjusting a focal length of the first camera to the target focal length; or in a case that the target focal length exceeds a maximum focal length of the first camera, switching the first camera to a second camera, and adjusting a focal length of the second camera to the target focal length, wherein a maximum focal length of the second camera is greater than the maximum focal length of the first camera.

\* \* \* \* \*